(12) United States Patent
Nanbu

(10) Patent No.: US 9,594,464 B2
(45) Date of Patent: Mar. 14, 2017

(54) SURFACE CAPACITIVE TOUCH PANEL AND REDUCTION FOR THE SAME

(71) Applicant: SMK Corporation, Tokyo (JP)

(72) Inventor: Mototoshi Nanbu, Tokyo (JP)

(73) Assignee: SMK Corporation, Tokyo (JP)

( * ) Notice: Subject to any disclaimer, the term of this patent is extended or adjusted under 35 U.S.C. 154(b) by 103 days.

(21) Appl. No.: 14/465,845

(22) Filed: Aug. 22, 2014

(65) Prior Publication Data

US 2014/0362310 A1 Dec. 11, 2014

Related U.S. Application Data

(63) Continuation of application No. PCT/JP2012/008067, filed on Dec. 18, 2012.

(30) Foreign Application Priority Data

Mar. 29, 2012 (JP) ................................ 2012-076578

(51) Int. Cl.
*G06F 3/044* (2006.01)
*G06F 3/041* (2006.01)

(52) U.S. Cl.
CPC ............ *G06F 3/044* (2013.01); *G06F 3/0416* (2013.01)

(58) Field of Classification Search
CPC ......... G06F 3/044; G06F 3/0416; G06F 3/048
See application file for complete search history.

(56) References Cited

U.S. PATENT DOCUMENTS

| 6,326,564 B1 | 12/2001 | Komatsu et al. |
| 2005/0275415 A1 | 12/2005 | Sato et al. |
| 2010/0026660 A1* | 2/2010 | Kitamura ................ G06F 3/044 345/174 |

(Continued)

FOREIGN PATENT DOCUMENTS

| EP | 0718790 A1 | 6/1996 |
| JP | H08-171449 A | 7/1996 |

(Continued)

OTHER PUBLICATIONS

International Search Report for International Application No. PCT/JP2012/008067, issued by the Japanese Patent Office on Jan. 29, 2013.

(Continued)

*Primary Examiner* — Larry Sternbane
*Assistant Examiner* — Sepehr Azari

(57) ABSTRACT

A transparent input operation plate at least an input operation area of which inside an opening is made of a transparent member is supported on an insulating support member so as to cover an aperture of the opening. A plurality of detection electrodes are arranged on the insulating support member so as to be in contact with the transparent input operation plate around the opening. Transmitting means transmits an alternating-current detection signal that changes relative potentials between an input operation member and the respective detection electrodes. Based on a relative ratio of the reception levels of the alternating-current detection signal appearing on a pair of detection electrodes opposed across the opening, an input operation position of the input operation member in the opposed direction is detected.

16 Claims, 9 Drawing Sheets

(56) References Cited

U.S. PATENT DOCUMENTS

| | | | | |
|---|---|---|---|---|
| 2010/0259503 A1* | 10/2010 | Yanase | ................... | G06F 3/044 |
| | | | | 345/174 |
| 2011/0134079 A1* | 6/2011 | Stark | .................... | G06F 3/0416 |
| | | | | 345/175 |
| 2012/0056298 A1* | 3/2012 | Kuroki | ............... | H01L 23/5223 |
| | | | | 257/532 |

FOREIGN PATENT DOCUMENTS

| JP | 2000-020229 A | 1/2000 |
|----|---------------|---------|
| JP | 2005-337773 A | 12/2005 |
| JP | 2012-003554 A | 1/2012 |
| TW | M371275 U | 12/2009 |

OTHER PUBLICATIONS

Dffice Action issued for counterpart Taiwanese Application 101132739, issued by the Taiwan Intellectual Property Office on Mar. 25, 2016.

\* cited by examiner

SURFACE CAPACITIVE TOUCH PANEL AND REDUCTION FOR THE SAME

CROSS REFERENCE TO RELATED APPLICATION

The contents of the following Japanese and PCT patent applications are incorporated herein by reference,
NO. 2012-076578 filed on Mar. 29, 2012, and
NO. PCT/JP2012/008067 filed on Dec. 18, 2012.

FIELD

The present invention relates to a capacitive touch panel which is arranged on a display and detects an input operation position of an input operation member for making an input operation with an icon or the like displayed on the display as an index. More specifically, the present invention relates to a capacitive touch panel which detects an input operation position from an arrangement position of a detection electrode or electrodes of which a capacitance with the input operation member increases as the input operation member approaches.

BACKGROUND

A touch panel is used as a pointing device to input instructions about icons and the like displayed on a display of an electronic apparatus. Depending on the method for detecting an input operation position, touch panels of various detection types have been known. Examples thereof include a capacitive type, a resistive film type, and an optical type. A resistive touch panel includes a resistive coating having a uniform resistance per unit length, arranged along an input operation surface. Distances between detection electrodes and an input operation position are identified from resistances therebetween, whereby the input operation position is detected.

In order for the resistive touch panel to make the display installed on the rear side viewable, the detection electrodes and the resistive film arranged on the surface or backside of the input operation surface need to be made of expensive transparent materials. Since transparent materials themselves have a limited transmittance, there is a problem that the display becomes less viewable through the touch panel.

A capacitive touch panel utilizes the fact that an input operation increases the stray capacitance of a detection electrode or electrodes that the input operation member approaches (the capacitances between the input operation member and the detection electrodes). The capacitive touch panel detects an input operation position on an input operation surface where detection electrodes are arranged, on the basis of a change in capacitance between the input operation member and the detection electrodes. For example, a known conventional capacitive touch panel includes a large number of X-side detection electrodes and Y-side detection electrodes which are formed in a matrix configuration to intersect each other on the surface and backside of an insulating substrate. The capacitive touch panel detects the input operation position of the input operation member such as a finger on the basis of the arrangement positions of X- and Y-side detection electrodes of which the capacitances increase near the location where the input operation member approaches (see Patent Literature 1).

The change in capacitance resulting from the approach of the input operation member to a specific detection electrode is small and inversely proportional to the distance between the input operation member and the detection electrode. In the capacitive touch panel according to Patent Literature 1, the large number of X- and Y-side detection elements for detecting a change in capacitance are arranged close to the input operation area near input operation positions. In order for the display on the rear side to be viewable, such detection electrodes are made of a transparent material. Like the resistive touch panel, there is the problem that the cost is high and the transmittance decreases to make the display less viewable.

An optical touch panel includes a plurality of pairs of light emitting elements and light receiving elements which are arranged around an input operation surface to form a grid of optical paths over the input operation surface. The input operation position is detected on the basis of the arrangement positions of pairs of light emitting and receiving elements of which the optical paths are blocked by the input operation. In such an optical touch panel, the detection elements for detecting the input operation position are arranged around the input operation surface. The surface of a transparent plate such as a glass substrate can thus be used as the input operation area, so that input operations can be made while viewing the display on the rear side through the transparent plate.

CITATION LIST

Patent Literature

Patent Literature 1: Japanese Patent Application Publication No. 2005-337773

SUMMARY

Technical Problem

As described above, in the conventional resistive and capacitive touch panels, the resistive film and/or detection electrodes made of a transparent material are arranged on the input operation area for the input operation member to be brought close to while viewing the display installed on the rear side. This not only increases the manufacturing cost but also causes the problem that the display on the rear side has poor viewability because the transparent conductors are not perfectly transparent.

No such problem occurs with the optical touch panel. However, the provision of a large number of light emitting elements and light receiving elements around the input operation area is far more expensive than the structure of simply forming a resistive film and/or detection electrodes. Moreover, the optical touch panel is complicated in structure and large in size, and has thus been unusable as an instruction input device of a portable terminal and the like.

With the optical touch panel, the detection accuracy for detecting an input operation position is determined by the arrangement pitch of the light emitting elements and the light receiving elements. To detect an input operation position with high accuracy, a large number of light emitting elements and light receiving elements need to be arranged at narrower pitches. This increases the manufacturing cost. In addition, there has been a limit in improving the detection accuracy.

A touch panel used as a pointing device detects and outputs an input operation position for moving and controlling a cursor or the like displayed on a display. Whatever the detection method is, the touch panel is desired to output a determination input equivalent to a switch input of a mouse in addition to the output of the input operation position.

Some conventional touch panels are provided with an additional switch that responds to pressing of the input operation surface, and output a determination input in response to a pressing operation on the switch. Others output a determination input according to an arrangement that a tapping operation of tapping lightly on the input operation surface by an input operation member is handled as an input operation for a determination input. In the former method, the additional switch needs to be arranged around the input operation area. In the latter method, the operator needs to make the input operation according to the operation procedure established for each touch panel. To make a drag operation, which includes outputting a determination input while outputting an input operation position, the operator needs to make an input operation according to a more complicated operation procedure.

The present invention has been made in view of such conventional problems. It is an object of the present invention to provide an inexpensive highly-viewable capacitive touch panel without arranging resistors or detection electrodes made of a transparent material in an input operation area.

Another object of the present invention is to provide a capacitive touch panel which has a simple configuration that can be thinned overall, and of which an input operation area can be formed in part of a transparent input operation plate.

Another object of the present invention is to provide a capacitive touch panel which can output a determination input in response to a touch operation of simply touching an input operation area of a transparent input operation plate where no resistor or detection electrode is formed.

Solution to Problem

To achieve the foregoing objects, the capacitive touch panel according to a first aspect of the present invention is a capacitive touch panel that includes a plurality of detection electrodes insulated from each other and detects an input operation position of an input operation member on the basis of arrangement positions of the respective detection electrodes and capacitances between the respective detection electrodes and the input operation member, the capacitive touch panel including: an insulating support member that has an opening; a transparent input operation plate that is supported by the insulating support member to cover an aperture of the opening, and at least an input operation area of which above the opening is made of a see-through transparent member; the plurality of detection electrodes that are in contact with the transparent input operation plate and are arranged on the transparent input operation plate or the insulating support member around the opening so as to be insulted from each other; transmitting means for transmitting an alternating-current detection signal that changes relative potentials between the input operation member and the respective detection electrodes; signal detecting means for detecting a reception level of the alternating-current detection signal appearing on each of the detection electrodes via a capacitance between each of the detection electrodes and the input operation member; and input position detecting means for comparing relative distances between the input operation member and the arrangement positions of the respective detection electrodes on the basis of the reception levels of the alternating-current detection signal detected by the signal detecting means at the respective detection electrodes, and detecting the input operation position of the input operation member on the input operation area.

A capacitance $C_m$ between a detection electrode in contact with the transparent input operation plate around the opening and the input operation member is expressed as $C_m = \in \cdot s/d$, where d is the distance between the detection electrode and the input operation member, $\in$ is the permittivity of the transparent input operation plate therebetween or the transparent input operation plate and air therebetween, and s is the opposed area of the detection electrode and the input operation member. The reception level of the alternating-current detection signal is inversely proportional to the distance d between the detection electrode and the input operation member.

The permittivity $\in$ between the detection electrode and the input operation member and the opposed area s of the detection electrode and the input operation member are known in advance. The reception levels $V_i$ of the alternating-current detection signal detected by the signal detecting means at the respective detection electrodes are inversely proportional to the distances d between the respective detection electrodes and the input operation member. The input position detecting means can thus compare the relative distances between the respective detection electrodes and the input operation member on the basis of the reception levels $V_i$ of the alternating-current detection signal detected at the respective detection electrodes, and detect the input operation position of the input operation member on the input operation area.

The plurality of detection electrodes are arranged around the opening of the insulating support member without blocking the input operation area. A display on the rear side can thus be seen through the input operation area even if the detection electrodes are made of a nontransparent conductive material.

The capacitive touch panel according to a second aspect of the present invention includes touch input detecting means for, if the reception level of the alternating-current detection signal appearing on any one of the detection electrodes increases at a rate higher than or equal to a predetermined threshold as compared to the reception level immediately before, determining that a touch input of touching the transparent input operation plate with the input operation member is made.

Before the input operation member touches the transparent input operation plate, the transparent input operation plate and air are interposed between the detection electrodes and the input operation member. If the input operation member is touching the transparent input operation plate, there is interposed only the transparent input operation plate. As compared to the specific permittivity of air, which is approximately 1, the transparent input operation plate has a specific permittivity at least several times higher. If a touch input of touching the transparent input operation plate with the input operation member is made, the capacitances $C_m$ between the detection electrodes and the input operation member increase sharply. The reception level appearing on each detection electrode increases several times as compared to that detected by the signal detecting means immediately before. Using a predetermined increase rate lower than or equal to the increase rate as a threshold, the touch input determining means can thus determine a touch input to be made if the reception level appearing on any of the detection electrodes increases at a rate beyond the threshold.

In the capacitive touch panel according to a third aspect of the present invention, the signal detecting means detects only the reception level of the alternating-current detection signal appearing on one or a plurality of specific detection electrodes until the touch input detecting means determines that a touch input is made. After the touch input detecting means determines that a touch input is made, the signal detecting means detects the reception levels of the alternating-current detection signal appearing on all the detection electrodes. The input position detecting means detects an input operation position of an input operation of touching the transparent input operation plate with the input operation member on the basis of the reception levels of the alternating-current detection signal detected at the respective detection electrodes.

During standby for waiting for an input operation until the touch input detecting means determines that a touch operation is made, the signal detecting means detects only the reception level of the alternating-current detection signal appearing on a limited number of specific detection electrodes. If the operator touches the input operation area with the input operation member to make an input operation, the touch input detecting means determines that a touch input is made. The signal detecting means then detects the reception levels of the alternating-current detection signal appearing on all the detection electrodes. The input position detecting means detects the input operation position on the basis of the reception levels of the alternating-current detection signal detected at all the detection electrodes.

The capacitive touch panel according to a fourth aspect of the present invention includes one or a plurality of the detection electrodes arranged on each of two sides of the opening opposed in either one of orthogonal X and Y directions, the one or plurality of detection electrodes being arranged along a direction orthogonal to the opposed direction. The input position detecting means compares relative distances between the input operation member and the two respective sides of the opening on the basis of the reception levels of the alternating-current detection signal appearing on the detection electrodes arranged on the two sides, and detects the input operation position in the opposed direction on the input operation area along an XY plane.

The sum of the reception levels of the alternating-current detection signal appearing on respective detection electrodes arranged along the direction orthogonal to the opposed direction is generally proportional to the permittivity between the respective detection electrodes and the input operation member and the sum of the areas of the respective detection electrodes facing the input operation member. The permittivity between the detection electrode(s) on one side and the input operation member is approximately the same as that between the detection electrode(s) on the other side and the input operation member. The ratio of the opposed areas of the detection electrodes on one side and on the other side is known in advance. The ratio between the distances from the opposed sides of the opening where the detection electrodes on one side and the other side are arranged to the input operation member can thus be determined from the ratio between the sum of the reception level(s) of the alternating-current detection signal appearing on the detection electrode(s) on one side and the sum of the reception level(s) of the alternating-current detection signal appearing on the detection electrode(s) on the other side. Unless the input operation member is significantly far above the input operation area, the ratio between the distances from the respective sides of the opening to an input operation position where the input operation member is projected upon the input operation area along the XY plane is approximately equal to the ratio between the distances from the respective opposed sides of the opening to the input operation member. The input operation position in the opposed direction on the input operation area can thus be detected from the ratio between the sums of the reception levels of the altering-current detection signal appearing on the detection electrodes arranged on both sides and the known distance of the opening in the opposed direction.

In the capacitive touch panel according to a fifth aspect of the present invention, the detection electrodes have an erected surface that is erected in a Z direction and faces in the opposed direction.

Such a configuration increases the opposed areas of the detection electrodes with respect to the input operation member, and increases the capacitance between the detection electrode and the input operation member, thereby increasing the reception levels appearing on the detection electrodes. The input operation position in the opposed direction can thus be detected more accurately.

In the capacitive touch panel according to a sixth aspect of the present invention, the detection electrodes are formed by vapor deposition on end surfaces of the transparent input operation plate.

The detection electrodes having an erected surface can thus be formed in the process of manufacturing the transparent input operation plate.

In the capacitive touch panel according to a seventh aspect of the present invention, a shield plate supported by the insulating support member covers the detection electrodes from above in a direction orthogonal to the input operation area.

The shield plate is interposed between an upper part of the input operation member inputting the input operation position and the detection electrodes. This prevents the capacitances between the input operation member at the input operation position and the detection electrodes from being affected by capacitive coupling between the upper part of the input operation member and the detection electrodes. The upper part of the input operation member is thus prevented from being erroneously detected as an input operation position.

In the capacitive touch panel according to an eighth aspect of the present invention, the transparent input operation plate supported by the insulating support member is arranged in a case of an apparatus, the case making the input operation area face above through a window hole. A shield layer covering the detection electrodes from above is formed on a surface or backside of the case around the window hole.

The shield layer is interposed between an upper part of the input operation member inputting the input operation position and the detection electrodes. This prevents the capacitances between the input operation member at the input operation position and the detection electrodes from being affected by capacitive coupling between the upper part of the input operation member and the detection electrodes. The upper part of the input operation member is thus prevented from being erroneously detected as an input operation position.

In the capacitive touch panel according to a ninth aspect of the present invention, with a plurality of detection electrodes arranged along either one of the X and Y directions around the opening as arrangement direction detection electrodes, the input position detecting means compares the reception levels of the respective arrangement direction detection electrodes and detects the input operation position in an arranged direction on the input operation area along the XY plane.

Suppose that the arrangement direction detection electrodes have the same shape and are arranged in the same orientation. An arrangement direction detection electrode that falls on a direction orthogonal to the arranged direction from the input operation member has the smallest distance to the input operation member and the largest opposed area with respect to the input operation member as compared to the other arrangement direction detection electrodes. The maximum reception level appears on such an arrangement direction detection electrode. The farther the arrangement direction detection electrodes are from the input operation member in the arranged direction, the lower the reception levels appearing on the arrangement direction detection electrodes. The input position detecting means therefore compares the reception levels of the respective arrangement direction detection electrodes, and detects the position in the arranged direction where the maximum reception level appears as the input operation position on the input operation area.

By using the detection electrodes arranged along the arranged direction on one side of the opening as the arrangement direction detection electrodes, the input operation position in the arranged direction on the input operation area can be detected.

In the capacitive touch panel according to a tenth aspect of the present invention, the input position detecting means compares the reception levels of the respective arrangement direction detection electrodes and detects the input operation position in the arranged direction on the basis of an arrangement position of the arrangement direction detection electrode at which the maximum reception level is detected.

The arrangement position of the arrangement direction detection electrode on which the maximum detection level appears is the same as or close to the input operation position in the arranged direction on the input operation area. The input position detecting means therefore compares the reception levels of the respective arrangement direction detection electrodes, and detects the input operation position in the arranged direction on the input operation area on the basis of the arrangement position of the arrangement direction detection electrode on which the maximum reception level appears.

In the capacitive touch panel according to an eleventh aspect of the present invention, the opening has a rectangular outline along the X and Y directions. The plurality of detection electrodes are arranged only on both sides of the opening opposed in either one of the X and Y directions, the detection electrodes being arranged along a direction orthogonal to the opposed direction. The plurality of detection electrodes arranged along the direction orthogonal to the opposed direction on at least one side of the opening are used as the arrangement direction detection electrodes.

The input operation position in the X and Y directions on the input operation area can be detected simply by using the detection electrodes arranged on at least the one side, among the detection electrodes arranged on both sides, as the arrangement direction detection electrodes.

According to the first aspect of the present invention, no transparent electrode or transparent resistor for detecting the input operation position is arranged on the input operation area which is formed in the transparent input operation plate. The transmittance of the input operation area therefore will not decrease, and the display arranged on the rear side is easily viewable.

The plurality of detection electrodes and lead lines connecting the detection electrodes to the signal detecting means are formed around the opening of the insulating support member. The detection electrodes and the lead lines can thus be formed at low cost by using general-purpose nontransparent conductive materials.

The input operation position is detected on the basis of the relative distances between the respective detection electrodes and the input operation member. It is therefore possible to detect not only the input operation position of an input operation made by bringing the input operation member such as a finger into contact with the transparent input operation, but also that of a noncontact input operation made by bringing the input operation member close to above the input operation area.

According to the second aspect of the present invention, no detection electrode or detection resistor is formed on the input operation area to detect a touch input. The display arranged on the rear side via the input operation area thus has high viewability.

A touch input can be detected by an operation of simply touching the transparent input operation plate in which the input operation area is set.

The signal detecting means for detecting the input operation position can be used to detect a touch input on the basis of the reception levels detected by the signal detecting means. This eliminates the need to provide additional detecting means for detecting a touch input, such as a detection switch.

According to the third aspect of the present invention, the signal detecting means detects only the reception level(s) of the alternating-current detection signal appearing on the limited number of specific detection electrodes during standby when no input operation is made. This can reduce the power consumption during standby.

In a series of processes for making an input operation where the operator touches the transparent input operation plate with the input operation member such as a finger and inputs an input operation position, the input operation is naturally detected. No additional operation is thus needed to exit the standby operation.

According to the fourth aspect of the present invention, the detection electrodes are arranged on both sides of the openings opposed in either one of the X and Y directions. As a result, the input operation position in the opposed direction on the input operation area can be detected regardless of whether the input operation is one made by bringing the input operation member into contact with the transparent input operation plate or a noncontact input operation.

The absolute values of the reception levels appearing on each detection element can be compared to distinguish a contact input operation from a noncontact input operation. Input operation positions of two different types of input operations can thus be output.

According to the fifth aspect of the present invention, the detection accuracy of the input operation position can be increased by simple machining of forming an erected surface on the detection electrodes.

According to the sixth aspect of the present invention, the detection electrodes having an erected surface can be formed in the process of manufacturing the transparent input operation plate such as a glass substrate, without the step of bending the detection electrodes or attaching the resulting detecting electrodes to the transparent input operation plate.

According to the seventh aspect of the present invention, the input operation position of the input operation member can be accurately detected.

According to the eighth aspect of the present invention, the shield layer is formed on the surface or backside of the case around the window hole. With such a simple configuration, the detection accuracy of the input operation position by the input operation member can be increased.

According to the ninth aspect of the present invention, the input operation position in the X and Y directions on the input operation area can be detected by simply arranging the detection electrodes on both sides of the opening opposed in one direction.

According to the tenth aspect of the present invention, the input operation position in the arranged direction on the input operation area can be easily detected on the basis of the arrangement position of the arrangement direction detection electrode on which the maximum reception level appears.

According to the eleventh aspect of the present invention, the input operation position in the X and Y directions of the input operation area can be detected by simply arranging the detection electrodes on both opposite sides of the opening. A large-sized input operation area and display area can thus be provided on a vertically-long, slim case of a mobile phone or the like without arranging detection electrodes on either side of the opening in the direction orthogonal to the opposed direction.

DESCRIPTION OF EMBODIMENTS

Figure 1:
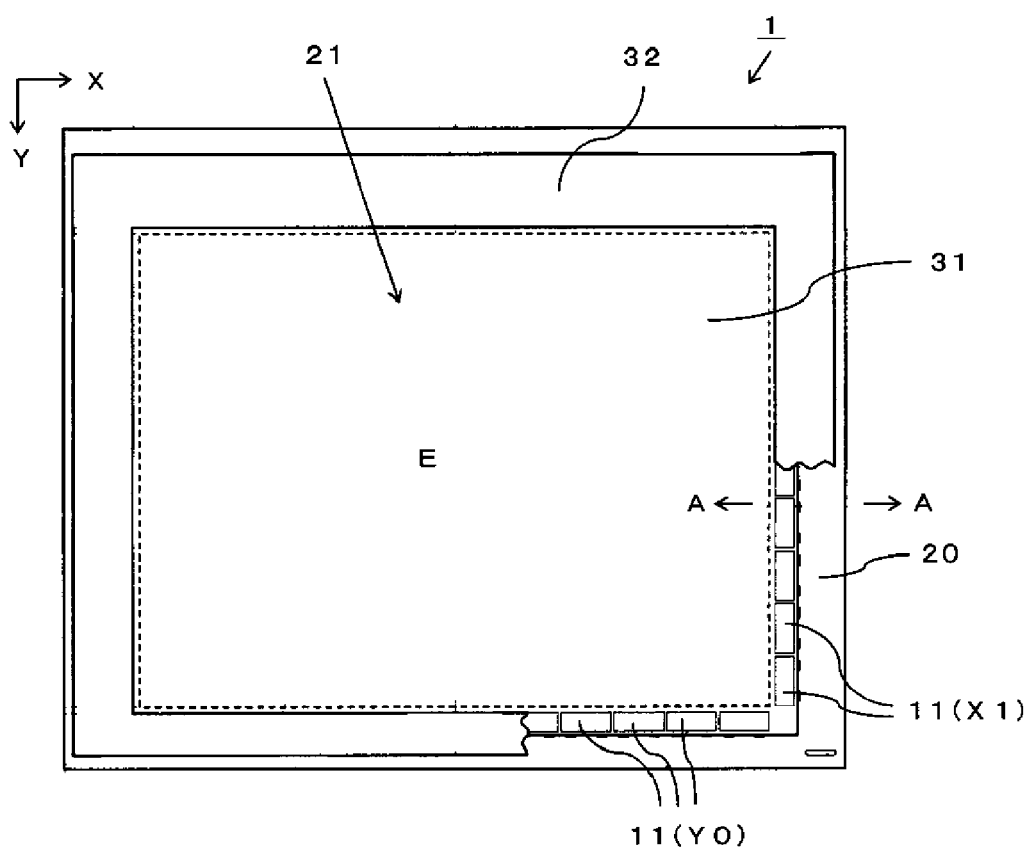
FIG. 1 is a partially-broken plan view of a capacitive touch panel 1 according to a first embodiment of the present invention.
Figure 5:
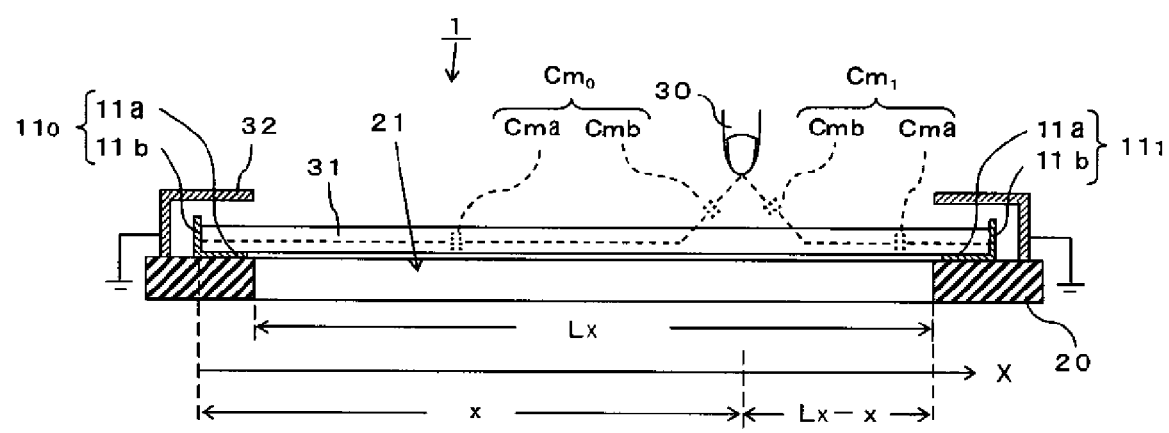
FIG. 5 is a longitudinal sectional view of the capacitive touch panel 1.

A capacitive touch panel (hereinafter, referred to as a touch panel) 1 according to a first embodiment of the present invention will be described below with reference to FIGS. 1 to 10. As shown in FIGS. 1 and 5, the touch panel 1 includes an insulating substrate 20, a large number of detection electrodes 11, a glass substrate 31, and a shield plate 32. The insulating substrate 20 has a rectangular frame shape, and has an opening 21 of oblong rectangular shape formed in its center. The detection electrodes 11 are formed on the insulating substrate 20 along the periphery of the opening 21. The transparent glass substrate 31 is placed on the insulating substrate 20 with the detection electrodes 11 therebetween so as to cover the aperture of the opening 21. The shield plate 32 covers the detection electrodes 11 from above, and is fixed to the insulating substrate 20.

Figure 2:
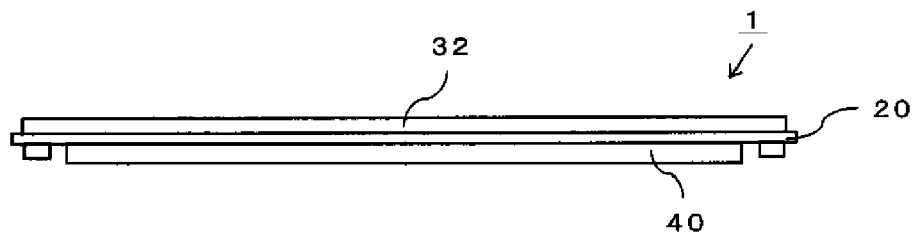
FIG. 2 is a side view of the capacitive touch panel 1 and a display device 40.
Figure 6:
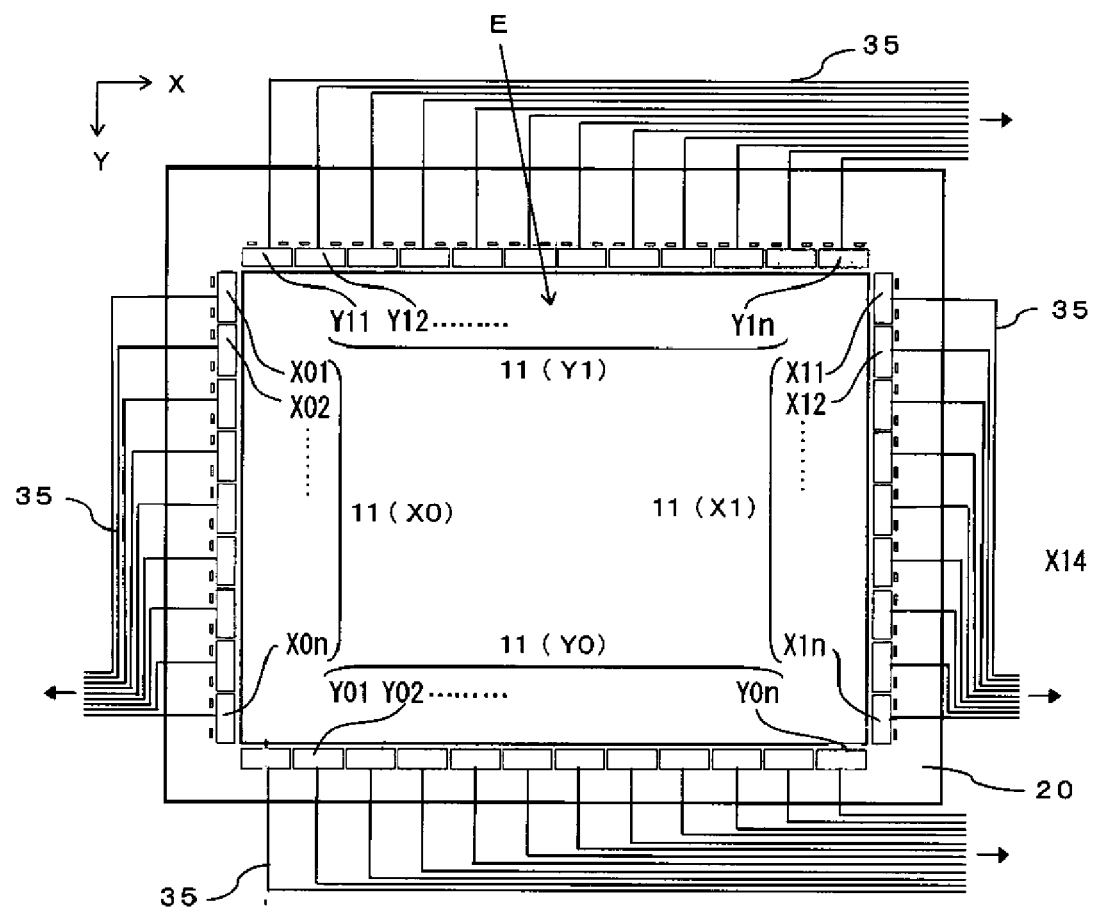
FIG. 6 is a plan view of the touch panel 1 excluding a shield plate 32.

As shown in FIG. 2, a liquid crystal display element 40 for displaying a predetermined cursor, icons, and the like is stacked and arranged under the touch panel 1. The liquid crystal display element 40 is viewable through the transparent glass substrate 31 in the opening 21. In the present embodiment, the surface of the glass substrate 31 surrounded by the opening 21 serves as an input operation area E. The operator brings a finger 30 close to or into contact with the input operation area E to make an input operation while viewing a display of the liquid crystal display element 40. As shown in FIG. 6, the directions along the rectangular outline will be referred to as an X direction and a Y direction, which are orthogonal to each other. To detect an input operation position on the input operation area E along an XY plane in terms of XY position coordinates, a large number of detection electrodes $X01, X02, \ldots, X0n$ are arranged along the periphery of either one of sides of the opening 21 opposed in the X direction. A large number of detection electrodes $X11, X12, \ldots, X1n$ are arranged along the periphery of the other side. A large number of detection electrodes $Y01, Y02, \ldots, Y0n$ are arranged along the periphery of either one of sides of the opening 21 opposed in the Y direction. A large number of detection electrodes $Y11, Y12, \ldots, Y1n$ are arranged along the periphery of the other side. The detection electrodes 11 (X0, X1, Y0, and Y1) are uniformly arranged at predetermined pitches in the X and Y directions (hereinafter, referred to as arrangement directions) along the periphery of the opening 21. The finger 30 making an input operation in any position of the input operation area E is opposed to at least a pair of detection electrodes ($X0n$ and $X1n$, or $Y0n$ and $Y1n$) in each of the X and Y directions.

The insulating substrate 20 is a printed-circuit board. Flat electrodes 11a of the detection electrodes 11 (X0, X1, Y0, and Y1) are each formed by a conductive pattern of a thin strip shape on the printed-circuit board. As shown in FIG. 6, the flat electrodes 11a are connected to respective input terminals of a multiplexer 12 to be described later by a lead wiring pattern 35.

Figure 3:
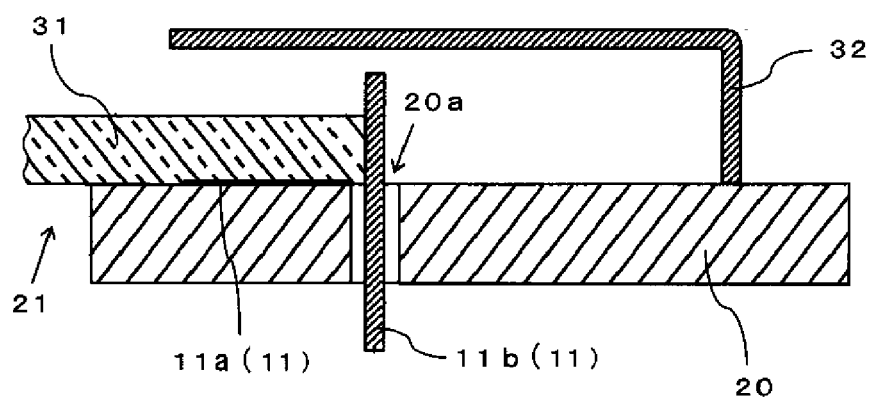
FIG. 3 is an enlarged sectional view taken along the line A-A of FIG. 1.
Figure 4:
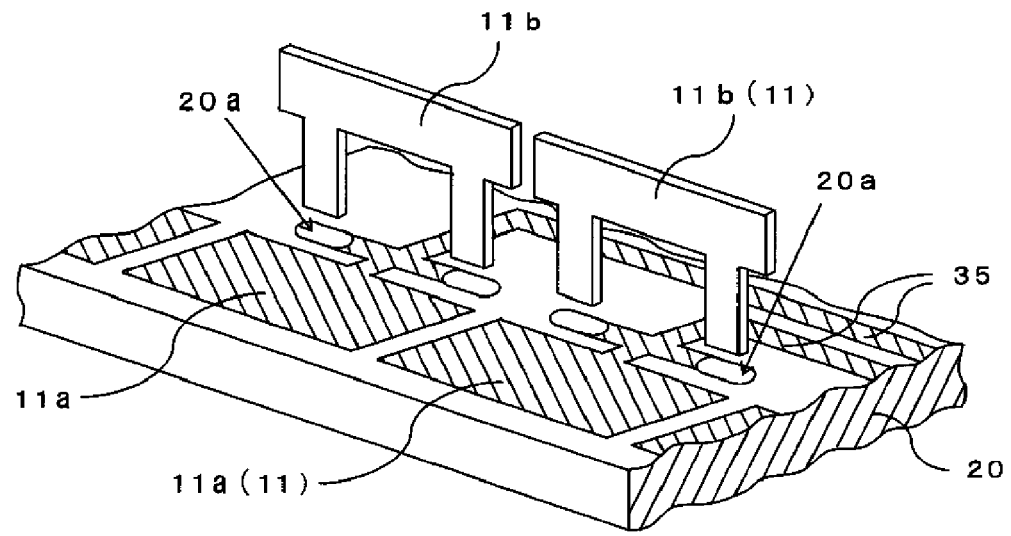
FIG. 4 is a partial enlarged perspective view showing an arrangement state of detection electrodes 11.

In the present embodiment, to increase areas opposed to the finger 30 approaching the input operation area E and increase capacitances Cm with respect to the finger 30, the detection electrodes 11 (X0, X1, Y0, and Y1) each include an erected electrode 11b. As shown in FIG. 3, the erected electrodes 11b are passed through holes 20a in the insulating substrate 20, and erected and supported along the arrangement directions. Leg portions of the erected electrodes 11b are soldered in the through holes 20a to the lead wiring pattern 35 lead out from the flat electrodes 11b, whereby erected surfaces of the detection electrodes 11 are formed. The inner erected surfaces of the erected electrodes 11b face the opening 21 to increase the areas opposed to the finger 30 approaching the input operation area E.

As shown in FIGS. 1 and 3, the shield plate 32 is fixed to the insulating substrate 20 to stand outside the erected electrodes 11b. The shield plate 32 is bent to over the opening 21 in parallel with the insulating substrate 20. The bent inner edges are slightly protruded from the flat electrodes 11a into the opening 21 side when seen in the vertical direction. The entire detection electrodes 11, including the flat electrodes 11a and the erected electrodes 11b, are thereby covered in the vertical direction. The shield plate 32 is connected to a low-voltage oscillation power supply line SGND to be described later via a wiring pattern on the insulating substrate 20, and grounded on an oscillation side circuit substrate 3. If an input operation member 30 is the operator's finger, the shield plate 32 is interposed between part of the operator above the finger and the detection electrodes 11. This prevents capacitances Cm to be described later between part of the finger inputting instructions about an input operation position and the detection electrodes 11 from being affected by portions other than the finger. The input operation position of the finger can thus be accurately detected on the basis of the capacitances Cm.

As shown in FIG. 5, the glass substrate 31 placed on the insulating substrate 20 is arranged on the flat electrodes 11a formed along the surface of the insulating substrate. The glass substrate 31 is positioned and supported by the inner sides of the large number of erected electrodes 11b with its end surfaces in contact with the erected surfaces of the erected electrodes 11b. Consequently, the flat electrode 11a and the erected electrode 11b of each detection electrode 11 are in contact with the bottom surface and an end surface of the glass substrate 31. As shown in the diagram, when the finger 30 approaches the input operation area E, each detection electrode 11 forms a capacitance Cm with the finger 30. The capacitance Cm includes a series connection of a capacitance Cma with the glass substrate 31 as the dielectric and a capacitance Cmb with air as the dielectric.

In the present embodiment, relative ratios of the capacitances Cm between the respective opposed detection electrodes 11 and the finger 30 are determined from the reception levels Vi of an alternating-current detection signal appearing on the respective detection electrodes 11. The input operation position in the opposed direction is then detected. A circuit configuration for detecting the input operation position will be described below.

Figure 7:
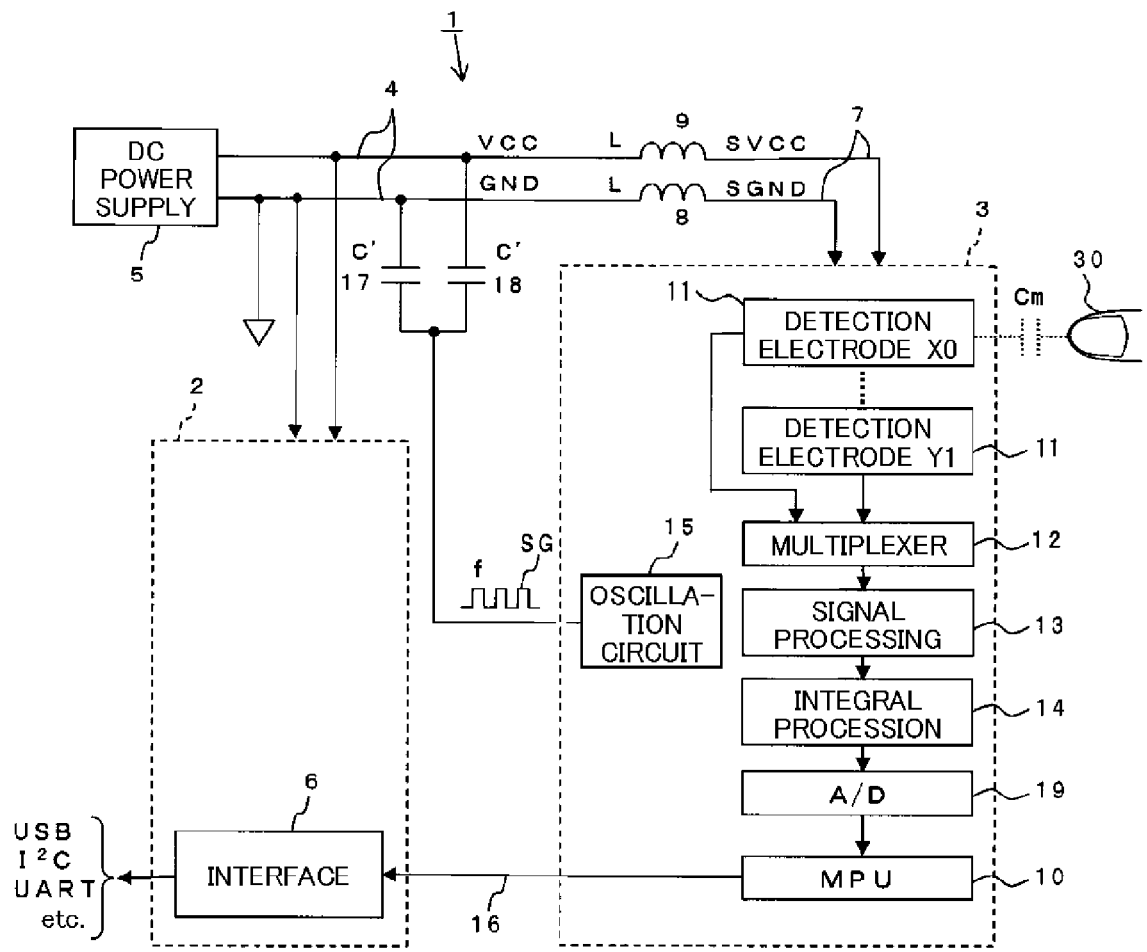
FIG. 7 is a block diagram of the capacitive touch panel 1.

As shown in FIG. 7, main circuit components constituting the touch panel 1, including the detection electrodes 11, are mounted on two types of separate substrates, a non-oscillation side circuit substrate 2 and the oscillation side circuit substrate 3. A reference power supply circuit 4 including a low-voltage reference power supply line GND and a high-voltage reference power supply line VCC is wired to the non-oscillation side circuit substrate 2. The low-voltage reference power supply line GND is set to a ground potential. A DC power supply 5 for applying a direct-current voltage Vcc is connected between the low-voltage reference power supply line GND and the high-voltage reference power supply line VCC. The circuit components mounted on the non-oscillation circuit substrate 2, including an interface circuit 6, are connected to the reference power supply circuit 4 and driven by the output voltage Vcc of the DC power supply 5.

An oscillation power supply circuit 7 including the low-voltage oscillation power supply line SGND and a high-voltage oscillation power supply line SVCC is wired to the oscillation side circuit substrate 3. The low-voltage oscillation power supply line SGND is connected to the low-voltage reference power supply line GND via a coil 8. The high-voltage oscillation power supply line SVCC is connected to the high-voltage power supply line VCC via a coil 9. The inductances of the coils 8 and 9 are both set to values that provide high impedance to an alternating-current detection signal SG having a specific frequency f to be described later. As employed herein, the coils 8 and 9 have the same inductance L.

An oscillation circuit 15 serving as transmitting means for transmitting the specific frequency f of the alternating-current detection signal SG is mounted on the oscillation side circuit substrate 3. The alternating-current detection signal SG is branched into two and connected to the low-voltage reference power supply line GND and the high-voltage reference power supply line VCC of the reference power supply circuit 4 via capacitors 17 and 18, respectively. The capacitors 17 and 18 have a capacitance C' for blocking a direct-current voltage. Suppose that the alternating-current detection signal SG having the specific frequency f is synchronously output to the low-voltage reference power supply line GND and the high-voltage reference power supply line VCC of the reference power supply circuit 4. Since the low-voltage reference power supply line GND of the reference power supply circuit 4 is grounded and has a stable potential, the potentials of the low-voltage oscillation power supply line SGND and the high-voltage oscillation power supply line SVCC of the oscillation power supply circuit 7 vary synchronously at the specific frequency f. The voltage between the two lines SGND and SVCC is the same as the direct-current output voltage Vcc of the reference power supply circuit 4. The specific frequency f of the alternating-current detection signal SG can be arbitrarily adjusted. As employed herein, the oscillation circuit 15 outputs an alternating-current detection signal SG having a specific oscillation frequency of 187 kHz.

Suppose that the low-voltage reference power supply line GND and the high-voltage reference power supply line VCC, and the low-voltage oscillation power supply line SGND and the high-voltage oscillation power supply line SVCC, are laid close to each other, and the power supply lines are short-circuited to each other in the band of the specific frequency f. When the alternating-current detection signal SG having the specific frequency f flows through the reference power supply circuit 4 and the oscillation power supply circuit 7, the reference power supply circuit 4 and the oscillation power supply circuit 7 can be expressed by the equivalent circuit diagram of FIG. 8.

Figure 8:
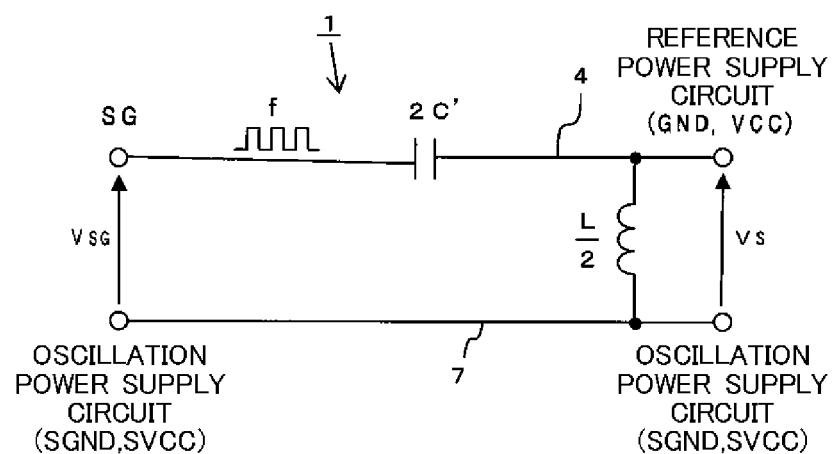
FIG. 8 is an equivalent circuit diagram of power supply circuits of the capacitive touch panel 1.

The capacitors 17 and 18 having a capacitance of C' are connected in parallel between the output of the oscillation circuit 15 on the oscillation power supply circuit 7 side and the reference power supply circuit 4. As shown in FIG. 8, the combined capacitance is 2C'. The combined inductance of the coils 8 and 9 connected in parallel between the reference power supply circuit 4 and the oscillation power supply circuit 7 is L/2. Such a capacitor and an inductor are connected in series in the closed circuit where the alternating-current detection circuit SG having the specific frequency f flows. There holds:

$$Vs = [\omega^2 LC'/(\omega^2 LC'-1)]Vsg, \qquad \text{Eq. (1)}$$

where Vsg is the amplitude (level) of the alternating-current detection signal SG, Vs is the voltage between the reference power supply circuit 4 and the oscillation power supply circuit 7 across the coils 8 and 9, and $\omega$ (rad/sec) is an angular velocity expressed by $2\pi f$. The circuit shown in FIG. 8 causes series resonance at $\omega^2 LC'=1$, in which case the frequency $f_0$ is given by:

$$f_0 = 1/[2\pi(LC')^{1/2}]. \qquad \text{Eq. (2)}$$

If the resonance frequency $f_0$ obtained by the relationship of Eq. (2) is used as the specific frequency f of the alternating-current detection signal SG, it is shown from Eq. (1) that the potential of the oscillation power supply circuit 7 theoretically oscillates to infinity with respect to the level of the alternating-current detection signal SG. The potentials of the detection electrodes 11 connected to the oscillation power supply circuit 7 can also be made to oscillate to infinity. In an actual touch panel 1, factors such as the inductances and stray capacitances of the reference power supply circuit 4 and the oscillation power supply circuit 7 prevent the occurrence of resonance at the frequency $f_0$ obtained by Eq. (2). The alternating-current signal SG flowing through the reference power supply circuit 4 and the oscillation power supply circuit 7 further causes energy loss, or power consumption by the internal resistances of the coils 8 and 9 in particular. As a result, the oscillation power supply circuit 7 oscillates with the amplitude of Vs expanded at a finite rate with respect to the level Vsg of the alternating-current detection signal SG.

A high voltage cannot be applied to the detection electrodes 11 with which the operator's finger 30 makes contact via the glass substrate 31. A not-shown resistor is therefore connected between the output of the oscillation circuit 15 and the capacitors 17 and 18, so that the alternating-current detection signal SG that causes relative oscillations of the detection electrodes 11 has an output level Vs of 5 V. The output level Vs of the alternating-current detection signal SG may be lowered by adjusting the specific frequency f of the alternating-current detection signal SG near the resonance frequency $f_0$.

The specific frequency f of the alternating-current detection signal SG may be an arbitrary frequency. In the vicinity of commercial alternating-current power supply lines, the input operation member 30 does not always have a constant potential, and common mode noise having the frequency of the commercial alternating-current power supply may be superimposed thereon. The alternating-current detection signal SG having the specific frequency f needs to be detected from the detection electrodes 11 in distinction from the frequency of the commercial alternating-current power supply. The specific frequency f is thus set to a frequency other than the frequency of the commercial alternating-current power supply and its harmonics.

The detection electrodes 11 described above are connected to either one of the low-voltage oscillation power supply line SGND and the high-voltage oscillation power supply line SVCC of the oscillation power supply circuit 7. As employed herein, the detection electrodes 11 are connected to the high-voltage oscillation power supply line SVCC. The detection electrodes 11 are all connected to the high-voltage oscillation power supply line SVCC and thus oscillate with the output level Vs of the alternating-current detection signal SG at the specific frequency f. Meanwhile, the finger 30 of the operator who is grounded in part, like at the feet, has a constant potential. A voltage as much as the output level Vs of the alternating-current detection signal SG thus occurs between the detection electrodes 11 and the finger 30. From the viewpoint of the oscillation power supply circuit 7 oscillating at the specific frequency f, the finger 30 serving as the input operation member is the signal generation source oscillating at the specific frequency f of the alternating-current detection signal SG. On the detection electrodes 11 which the finger 30 approaches and of which the capacitances Cm with the finger 30 increase, the alternating-current detection signal SG having the specific frequency f appears between the detection electrodes 11 and the finger 30 via the capacitances Cm.

The capacitance Cm between each detection circuit 11 and the finger 30 is expressed as Cm=∈0·∈1·s/d, where d is the distance between the detection electrode 11 and the finger 30, ∈0 is the vacuum permittivity, ∈1 is the specific permittivity of the dielectric therebetween, and s is the opposed area between the finger 30 and the detection electrode 11. As shown in FIG. 5, if the finger 30 is not in contact with the glass substrate 11, the capacitance Cm between the finger 30 and a detection electrode 11 is composed of, as described above, a series connection of a capacitance Cma using the glass substrate 31 as the dielectric and a capacitance Cmb using air as the dielectric. The resulting capacitance Cm is expressed as Cma·Cmb/(Cma+Cmb).

Suppose that detection electrodes $11_0$ and $11_1$ are opposed to the finger 30 in either of the X and Y directions (in FIG. 5, the X direction). In the present embodiment, the input operation position of the finger 30 in the opposed direction is detected from the relative ratio of capacitances $Cm_0$ and $Cm_1$ between the detection electrodes $11_0$ and $11_1$ and the finger 30. To simplify the calculation of the input operation position, all the detection electrodes 11 including the erected electrodes 11b are formed in the same shape, and a pair of detection electrodes $11_0$ and $11_1$ in an opposed direction have the same opposed areas s to the finger 30. The glass substrate 31 has a specific permittivity of ∈r sufficiently higher than the specific permittivity of air of approximately 1. Unless the finger 30 and the glass substrate 31 are widely separated from each other, the relative ratio of the capacitances $Cm_0$ and $Cm_1$ can thus be calculated by assuming their capacitances Cmb using air as the dielectric to be approximately the same, regardless of the input operation position between the detection electrodes $11_0$ and $11_1$ and the finger 30. Consequently, the input operation position can be detected from the ratio of the capacitances Cma using the glass substrate 31 as the dielectric, i.e., the relative ratio of the capacitances $Cm_0$ and $Cm_1$ calculated by Cm=∈0·∈r·s/d, regardless of whether the finger 30 is in contact with the glass substrate 31. Given the specific frequency f of the alternating-current detection signal SG, the reactance Xc of the capacitance Cm with respect to the alternating-current detection signal is expressed as Xc=1/(2π·f·Cm), which yields Xc=d/(ω·∈0·∈r·s).

Figure 10:
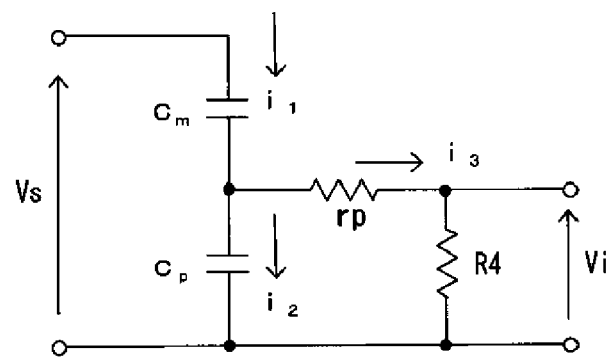
FIG. 10 is an equivalent circuit diagram showing the vicinity of a detection electrode 11 of the capacitive touch panel 1.

FIG. 10 is an equivalent circuit diagram of the entire signal detection circuit unit that detects a reception level Vi of the alternating-current detection signal SG appearing on a detection electrode 11. In the diagram, Cp is the stray capacitance between the detection electrode 11 and the low-voltage oscillation power supply line SGND, rp is the internal resistance of the detection electrode 11, and R4 is the resistance of an output resistor.

In the equivalent circuit diagram of FIG. 10, there holds:

$$i1=i2+i3, \qquad\qquad\text{Eq. (3)}$$

$$Vs=i1/(j\omega\cdot Cm)+i2/(j\omega\cdot Cp), \qquad\qquad\text{Eq. (4)}$$

$$-i2/(j\omega\cdot Cp)+i3\cdot rp+i3\cdot R4=0, \text{ and} \qquad\qquad\text{Eq. (5)}$$

$$i3\cdot R4=Vi. \qquad\qquad\text{Eq. (6)}$$

From Eq. (3) to Eq. (6), the following relationship is obtained:

$$Vi=[j\omega\cdot Cm/\{1/R4+j\omega(Cm+Cp)(rp/R4+1)\}]\cdot Vs. \qquad\text{Eq. (7)}$$

Suppose that the internal resistance rp is 0, and R4 is infinite because R4 is connected to an integrating operational amplifier A/D 25 to be described later via the multiplexer 12. Eq. (7) is transformed into:

$$Vi=Cm/(Cp+Cm)\cdot Vs.$$

Since the capacitance Cm is extremely smaller than the stray capacitance Cp, Eq. (7) can be further expressed as:

$$Vi=(Cm/Cp)\cdot Vs. \qquad\qquad\text{Eq. (8)}$$

As described above, the capacitance Cm between the input operation member 30 and the detection electrode 11 is expressed as Cm=∈0·∈r·s/d, which is substituted into Eq. (8) to yield:

$$Vi=\{\in 0\cdot \in r\cdot s/(d\cdot Cp)\}Vs. \quad \text{Eq. (9)}$$

In Eq. (9), (∈0·∈r·s/Cp) is a constant, and can be replaced with 1/k to express the reception level Vi of the alternating-current detection signal SG appearing on the detection electrode 11 as:

$$Vi=Vs/(d\cdot k). \quad \text{Eq. (10)}$$

As the distance d from the detection electrode 11 to the finger 30 decreases, the reception level Vi increases in value and approaches the output level Vs of the alternating-current detection signal SG. Note that if the finger 30 comes so close to the detection electrode 11 that the capacitance Cm therebetween becomes high and not negligible as compared to the stray capacitance Cp, Eq. (10) is no longer applicable. The reception level Vi at maximum coincides with the output level Vs.

Using Eq. (10), the reception levels Vi of the alternating-current detection signal appearing on a plurality of detection electrodes 11 can be compared to compare the distances between the finger 30 and the respective detection electrodes 11. In the present embodiment, an input operation position (x,y) in the X and Y directions parallel to the input operation area E is detected from the arrangement positions of the detection electrodes 11 (X0, X1, Y0, and Y1) and the reception levels Vi of the detection electrodes 11 (X0, X1, Y0, and Y1).

To detect the input operation position (x,y), circuit elements such as the analog multiplexer 12, a signal processing circuit 13, an integral processing circuit 14, an A/D converter 19, an MPU (microprocessor unit) 10, and the oscillation circuit 15 are mounted on the oscillation side circuit substrate 3. The circuit elements are each connected to the low-voltage oscillation power supply line SGND and the high-voltage oscillation power supply line SVCC of the oscillation power supply circuit 7 and operate with the output voltage Vcc of the DC power supply 5.

The analog multiplexer 12 switches and connects the detection electrodes 11 to the signal processing circuit 13 at regular intervals, or every 200 msec as employed herein, under switching control of the MPU 10. The analog multiplexer 12 outputs the alternating-current detection signal SG appearing on the respective detection electrodes 11 to the signal processing circuit 13 in order. More specifically, the detection electrodes 11 are all connected to the signal processing circuit 13 within a scan period in the order of the detection electrodes X01, X02, . . . , and X11, X12, . . . which are opposed in the X direction and the detection electrodes Y01, Y02, . . . , and Y11, Y12, . . . which are opposed in the Y direction.

Figure 9:
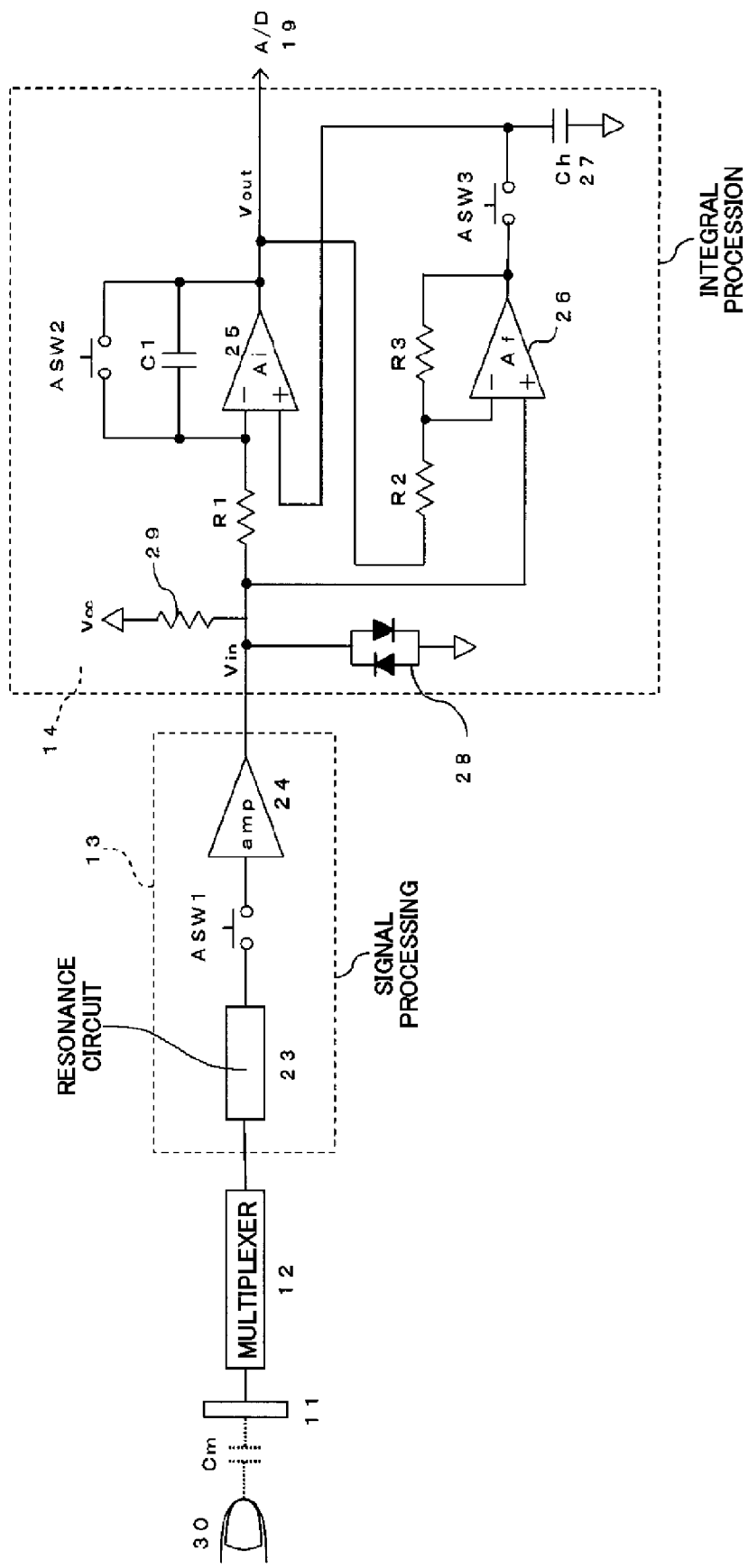
FIG. 9 is a circuit diagram showing details of a signal processing circuit 13 and an integral processing circuit 14 of FIG. 7.

As shown in FIG. 9, the signal processing circuit 13 includes a resonance circuit 23, an amplifier circuit 24, and a first analog switch ASW1. The resonance circuit 23 causes signals in a frequency band centered at the specific frequency f of the alternating-current detection signal SG to pass. The amplifier circuit 24 is intended for impedance conversion. The first analog switch ASW1 is connected in series between the resonance circuit 23 and the amplifier circuit 24. The resonance circuit 23 cuts off low-frequency components such as a direct-current signal and high-frequency noise such as common mode noise in the signal appearing on the detection electrode 11 connected via the analog multiplexer 12. The resonance circuit 23 outputs only the alternating-current detection signal SG to the amplifier circuit 24 in the subsequent stage. The amplifier circuit 24 is an impedance conversion element having near infinite input impedance and a small value of output impedance. The amplifier circuit 24 enables the integral processing circuit 14 connected on the output side to operate even with the weak alternating-current detection signal SG appearing on the detection electrode 11.

The first analog switch ASW1 is controlled ON/OFF by the MPU 10. The first analog switch ASW1 connects the resonance circuit 23 and the amplifier circuit 24 during an integral operation period (Tint) when the integral processing circuit 14 is performing an integral operation to be described later, and disconnects the resonance circuit 23 from the amplifier circuit 24 during an offset adjustment period (Tset) to be described later. The first analog switch ASW1 thereby prevents the alternating-current detection signal SG from being output to the integral processing circuit 14 during the offset adjustment period (Tset).

The integral processing circuit 14 includes a clamp diode circuit 28, a pull-up resistor 29, an integrating operational amplifier 25, an integrating resistor R1, an integrating capacitor C1, and a second analog switch ASW2. The clamp diode circuit 28 includes diodes of which anodes and cathodes are connected to each other. The pull-up resistor 29 pulls up the potential of the output of the signal processing circuit 13 to a predetermined potential. The integrating resistor R1 is connected between the output of the signal processing circuit 13 and the inverting input terminal of the integrating operational amplifier 25. The integrating capacitor C1 is connected between the inverting input terminal and the output terminal of the integrating operational amplifier 25. The second analog switch ASW2 is connected in parallel with the integrating capacitor C1 and controlled ON/OFF by the MPU 10.

The clamp diode circuit 28 clamps the output of the signal processing circuit 13, i.e., the voltage of the alternating-current detection signal SG so that the voltage oscillates within the range of the forward voltages of the pair of diodes with the potential pulled up by the pull-up resistor 29 at the center. The clamp diode circuit 28 outputs the clamped voltage to the integrating resistor R1.

Assume that Vin is the voltage of the alternating-current detection signal input to the inverting input terminal of the integrating operational amplifier 25 via the integrating resistor R1, Vout is the voltage output from the output terminal of the integrating operational amplifier 25, R is the resistance of the integrating resistor R1, and C is the capacitance of the integrating capacitor C1. Vout is expressed as:

$$Vout=-1/CR\cdot \int (Vin)dt. \quad \text{Eq. (11)}$$

The voltage Vout obtained by integrating the input voltage Vin is output from the output terminal of the integrating operational amplifier 25.

The second analog switch ASW2 is controlled ON by the MPU 10 for a short time after the start of the offset adjustment period (Tset). The second analogy switch ASW2 thereby quickly discharges the charge accumulated in the integrating capacitor C1 during the integral operation period (Tint) of the integral processing circuit 14. This prevents the charge voltage with which the integrating capacitor C has been changed in the previous integral operation period (Tint) from affecting an offset operation in the offset adjustment period (Tset) of the integral processing circuit 14 to be described later.

The inverting input terminal and the non-inverting input terminal of the integrating operational amplifier 25 have direct-current component errors therebetween due to an offset voltage of the integration operation amplifier 25 and other factors. Assuming that the combined total error voltage is represented by an offset voltage $\Delta v$, Eq. (11) is expressed as:

$$Vout = -1/CR \cdot \int (Vin + \Delta v) dt. \qquad \text{Eq. (12)}$$

Since the offset voltage $\Delta v$ is a direct-current component, Eq. (12) is expressed as:

$$Vout = -1/CR \cdot \int (Vin) dt - \Delta v \cdot t/CR. \qquad \text{Eq. (13)}$$

The error resulting from the offset voltage $\Delta v$ in the output voltage Vout increases with a lapse of time t.

Then, the integral processing circuit 14 further includes a feedback circuit unit to substantially eliminate the effect of the foregoing offset voltage $\Delta v$. As shown in FIG. 9, the feedback circuit unit includes a feedback operational amplifier 26, a third analog switch ASW3, and a holding capacitor 27. The third analog switch ASW3 is connected between the output of the feedback operational amplifier 26 and the non-inverting input terminal of the integrating operational amplifier 25. The holding capacitor 27 is connected between the third analog switch ASW3 and the non-inverting input terminal of the integrating operational amplifier 25, and charged with the output voltage of the feedback operational amplifier 26.

The inverting input terminal of the feedback operational amplifier 26 is connected to the output of the integrating operational amplifier 25 via a resistor R2. The non-inverting input terminal is connected to the input side of the integrating resistor R1. A resistor R3 connected between the inverting input terminal and the output terminal of the feedback operational amplifier 26 has the same resistance as that of the resistor R2. When the third analog switch ASW3 is controlled ON, the feedback operational amplifier 26 therefore functions to amplify a difference of the output voltage Vout of the integrating operational amplifier 25 with respect to the input voltage Vin with a gain of $-1$ by using the input voltage Vi input to the inverting input terminal of the integrating operational amplifier 25 as a reference potential, and feeds back the resultant to the non-inverting input terminal of the integrating operational amplifier 25.

During the offset adjustment period (Tset) controlled by the MPU 10, the third analog switch ASW3 is controlled ON. The first analog switch ASW1 is controlled OFF to disconnect the input of the integrating resistor R1 from the detection electrodes 11. This prevents the alternating-current detection signal SG from being input to the input side of the integrating resistor R1, and the potential of the inverting input terminal of the integrating operational amplifier 25 is maintained at a constant input voltage Vin.

Suppose that the foregoing offset voltage $\Delta V$ occurs on the inverting input terminal of the integrating operational amplifier 25 with respect to the non-inverting input terminal. After $\Delta t$, the integrating operational amplifier 25 outputs an integrated value of $-(Vin + \Delta v) \cdot \Delta t/CR$. The feedback operational amplifier 26 inputs $Vin + (Vin + \Delta v) \cdot \Delta t/CR$ to the non-inverting input terminal of the integrating operational amplifier 25. Since $\Delta t/CR$ is sufficiently smaller than 1, such feedback is repeated to make the output of the integrating operational amplifier 25 converge and stabilize at the offset voltage $\Delta v$. In such a state, the potential obtained by adding the offset voltage $\Delta v$ to the potential of the inverting input terminal of the integrating operational amplifier 25 becomes equal to the potential of the non-inverting input terminal. The holding capacitor 27 is charged with a correction voltage that makes the differential voltage between the non-inverting input terminal and the inverting input terminal, including the effect of the offset voltage $\Delta v$, zero. The offset adjustment period (Tset) is set to a time sufficient for the output Vout of the integrating operational amplifier 25 to reach and stabilize at the offset voltage $\Delta v$. A capacitor having a capacitance that becomes saturated when the output Vout of the integrating operational amplifier 25 is stabilized is used as the holding capacitor 27.

After the lapse of the offset adjustment period (Tset), the MPU 10 controls the first analog switch ASW1 ON and the third analog switch ASW3 OFF, thereby entering the integral operation period (Tint). In the integral operation period (Tint), the first analog switch ASW1 is controlled ON, whereby the alternating-current detection signal SG appearing on the detection electrode 11 selected and connected by the analog multiplexer 12 is input to the inverting input terminal of the integrating operational amplifier 25. The third analog switch ASW3 is controlled OFF, whereby the foregoing correction voltage having been charged into the holding capacitor 27 during the offset adjustment period (Tset) is input to the non-inverting input terminal of the integrating operational amplifier 25. This makes the differential voltage between the non-inverting input terminal and the inverting input terminal of the integrating operational amplifier 25, including the offset voltage $\Delta v$, zero. The output Vout of the integrating operational amplifier 25 does not include the error of $-\Delta v \cdot t/CR$ obtained by integrating the offset voltage $\Delta v$, shown in Eq. (13).

As a result, only the voltage Vin of the weak alternating-current detection signal SG is integrated and amplified to appear as the output Vout of the integrating operational amplifier 25. At determination time t1, the MPU 10 outputs the output Vout at the determination time t1 to the A/D converter 19 connected in the subsequent stage. The determination time t1 refers to when the same amount of time has elapsed from the start of the integral operation period (Tint) and immediately before the end of the integral operation period (Tint), the same amount of time being the same in each integral operation time (Tint). The integral operation period (Tint) is set to a period that is sufficiently shorter than the saturation time of the integrating capacitor C1—defined by CR and such that the voltage Vin of the alternating-current detection signal SG can be determined from its integral value, i.e., the output Vout of the integrating operational amplifier 25 at the determination time t1.

The A/D converter 19 quantizes the output Vout of the integrating operational amplifier 25 at the determination time t1, and outputs the resultant to the MPU 10.

The quantized data output from the A/D converter 19 expresses the reception level Vi of the alternating-current detection signal SG appearing on each detection electrode 11 selected and connected by the analog multiplexer 12 during the integral operation period (Tint). The MPU 10 functioning as input position detecting means calculates the sum of the reception levels Vi appearing on the detection electrodes 11 (X0, X1, Y0, and Y1) in each arrangement direction, and detects the input operation position of the finger 30 in the X and Y directions from the sum of the reception levels Vi in each arrangement direction.

Suppose that the distance between a pair of detection electrodes X0 and X1 opposed in the X direction is Lx, and the finger 30 is at an input operation position P(x) shown in FIG. 5. The reception level Vi0 of the alternating-current detection signal SG appearing on an arbitrary detection electrode X0$n$ and the reception level Vi1 of the alternating-current detection signal SG appearing on a detection electrode X1n that is arranged in the position opposed to the detection electrode X0n in the X direction are respectively expressed as:

$$Vi0 = Vs/(x \cdot k), \text{ and} \qquad \text{Eq. (14)}$$

$$Vi1 = Vs/((Lx-x) \cdot k). \qquad \text{Eq. (15)}$$

The ratio of the two levels, Vi0/Vi1, is expressed as:

$$Vi0/Vi1 = (Lx-x)/x. \qquad \text{Eq. (16)}$$

Such a relationship holds for all the pairs of detection electrodes X0 and X1 opposed in the X direction. Assume that the sum of the reception levels Vi of the alternating-current detection signal SG appearing on the detection electrodes X0 in one scan period is Vx0, and the sum of the reception levels Vi of the alternating-current detection signal SG appearing on the detection electrodes X1 is Vx1. There holds:

$$Vx0/Vx1 = (Lx-x)/x. \qquad \text{Eq. (17)}$$

Solving Eq. (17) for x yields:

$$x = Lx \cdot Vx1/(Vx0 + Vx1). \qquad \text{Eq. (18)}$$

The same holds for the Y direction. Suppose that the distance between a pair of detection electrodes Y0 and Y1 opposed in the Y direction is Ly. The relationship between the reception level Vi0 of the alternating-current detection signal SG appearing on an arbitrary detection electrode Y0n and the reception level Vi1 of the alternating-current detection signal SG appearing on a detection electrode Yin arranged in the opposed position to the detection electrode Y0n in the Y direction is expressed as:

$$Vi0/Vi1 = (Ly-y)/y. \qquad \text{Eq. (19)}$$

Assuming that the sum of the reception levels Vi of the alternating-current detection signal SG appearing on the detection electrodes Y0 in one scan period is Vy0, and the sum of the reception levels Vi of the alternating-current signal SG appearing on the detection electrodes Y1 is Vy1, there holds the relationship:

$$y = Ly \cdot Vy1/(Vy0 + Vy1). \qquad \text{Eq. (20)}$$

In such a manner, the input position (x,y) on the input operation area E in the X and Y directions can be easily obtained from Vx0, Vx1, Vy0, and Vy1.

Input operation data including the input operation position (x,y) detected by the MPU 10 is output to the interface circuit 6 mounted on the non-oscillation circuit substrate 2 via a signal line 16 which is insulated in terms of a direct current. The interface circuit 6 outputs the input operation data by USB communication, $I^2C$ communication, or the like to a host apparatus that uses the input operation data.

In the embodiment described above, the MPU 10 determines the sums (Vx0, Vx1, Vy0, and Vy1) of the reception levels Vi of the alternating-current detection signal SG appearing on the detection electrodes 11 (X0, X1, Y0, and Y1) in the respective arrangement directions. The MPU 10 then detects the input operation position (x,y) by using Eqs. (18) and (20). Instead, the MPU 10 may compare the reception level Vi0 of a detection electrode 11 on which the maximum reception level Vi appears among the detection electrodes 11 in each arrangement direction with the reception level Vi1 of the opposed detection electrode 11. In such a case, the MPU 10 can detect the input operation position (x,y) by using Eqs. (16) and (19).

Any one or more of the four types of detection electrodes (X0, X1, Y0, and Y1) including a plurality of detection electrodes 11 arranged in the respective arrangement directions may be configured as a single detection electrode 11 extending longitudinally in the arrangement direction. With such a single detection electrode 11, the reception level Vi of the detection electrode 11 may be considered to be the sum of the reception levels Vi of the detection electrodes 11 arranged in that arrangement direction. The MPU 10 can detect the input operation position (x,y) by using Eqs. (18) and (20).

Figure 11:
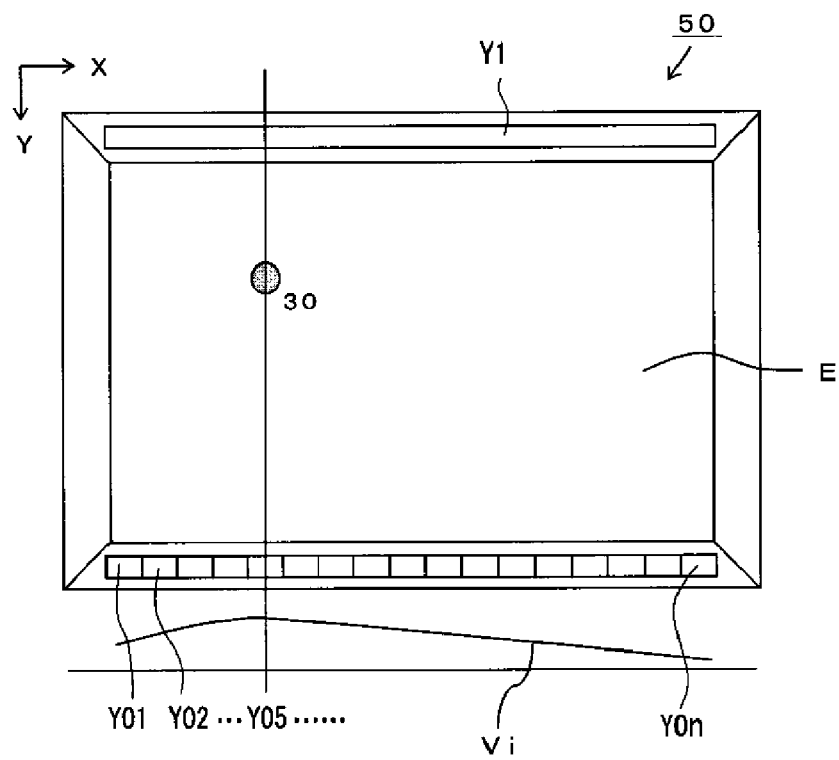
FIG. 11 is a plan view of a capacitive touch panel 50 according to a second embodiment of the present invention.

Any two of the four types of detection electrodes 11 (X0, X1, Y0, and Y1) arranged in the X and Y directions described above may be omitted without hindering the detection of the input operation position (x,y) on the input operation area E. FIG. 11 is a plan view of a capacitive touch panel 50 according to a second embodiment, where the detection electrodes X0 and X1 opposed in the X direction are omitted.

The touch panel 50 includes a large number of detection electrodes Y0 arranged in the X direction, which will be referred to as arrangement direction detection electrodes Y01, Y02, . . . , Y0n. The plurality of detection electrodes Y11, Y12, . . . , Y1n that have been opposed to the detection electrodes Y0 in the first embodiment are configured as a single detection electrode Y1. As shown in FIG. 11, among the large number of arrangement direction detection electrodes Y0 arranged in the arrangement direction (X direction), the arrangement direction detection electrode Y05 arranged in a direction orthogonal to the arrangement direction from the finger 30 is the closest to the finger 30. The arrangement direction detection electrode Y05 has the largest opposed area s with respect to the finger 30. The reception level Vi of the maximum value thus appears on the arrangement direction detection electrode Y05. Consequently, even if the touch panel 50 does not include the detection electrodes X0 and X1 opposed in the X direction, the input operation position (x) in the X direction can be detected from the arrangement position of the arrangement direction detection electrode Y05 where the reception level Vi of the maximum value appears among the arrangement direction detection electrodes Y0. The input operation position (x) in the X direction can be more accurately detected by comparing the reception level Vi of the arrangement direction detection electrode Y05 where the reception level Vi of the maximum value appears with the reception levels Vi appearing on the adjacent arrangement direction detection electrodes Y0.

The input operation position (y) in the Y direction can be detected from the sum Vy0 of the reception levels Vi of the arrangement direction detection electrodes Y0 and the reception level Vi of the single detection electrode Y1 by using Eq. (20). Here, the reception level Vi of the single detection electrode Y1 is considered to be the sum Vy1 of reception levels Vi.

According to the capacitive touch panel 50 of the second embodiment, the input operation position (x) in the X direction can be detected without the provision of the detection electrodes X0 and X1 opposed in the X direction. This allows a reduction of the width in the X direction. For example, even with a vertically-long case of a mobile phone or the like having not much space widthwise, the input operation position in the width direction can be detected without arranging the detection electrodes 11 sideways. The touch panel 50 having a large input operation area E can thus be mounted within the limited case.

Figure 12:
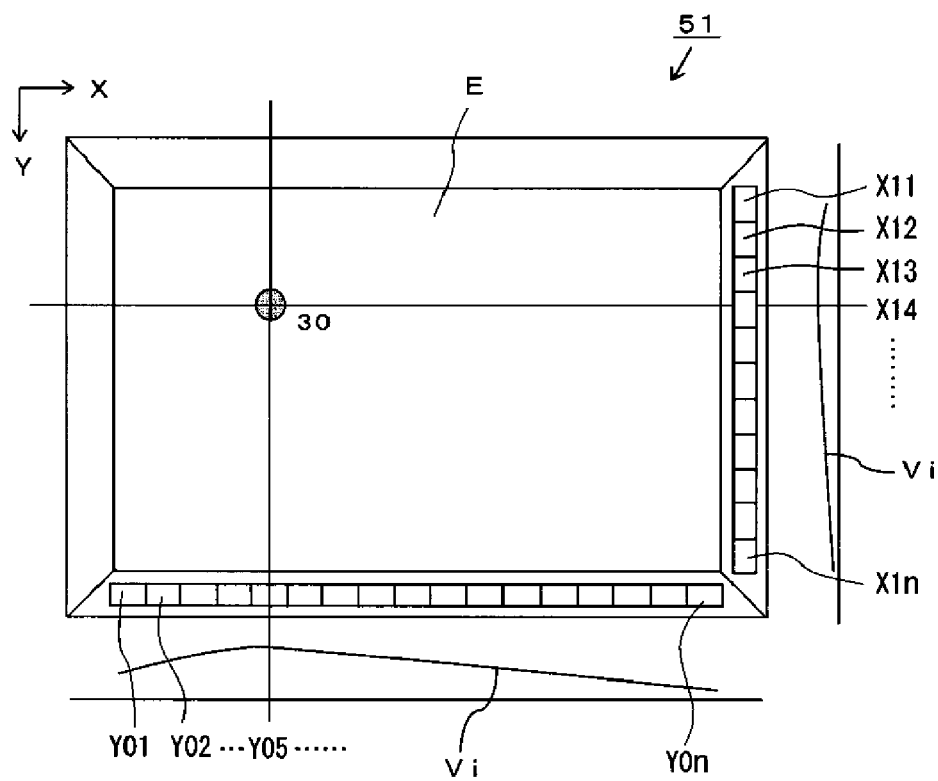
FIG. 12 is a plan view of a capacitive touch panel 51 according to a third embodiment of the present invention.

FIG. 12 is a plan view of a capacitive touch panel 51 according to a third embodiment, where two types of detection electrodes X0 and Y1 are omitted. The touch panel 51 includes detection electrodes Y0 and X1. The detection electrodes Y0 are constituted by a plurality of arrangement direction detection electrodes Y01, Y02, . . . , Y0n arranged in the X direction. The detection electrodes X1 are constituted by a plurality of arrangement direction detection electrodes X11, X12, . . . , X1n arranged in the Y direction.

Suppose that the finger 30 is making an input operation in the shown position. In the X direction, the reception level Vi peaks at the detection electrode Y05. In the Y direction, the reception level Vi peaks at the detection electrode X14. The input operation position (x,y) can be detected from the arrangement positions of such detection electrodes.

According to the capacitive touch panel 51 of the third embodiment, the touch panel 51 can be arranged so that the input operation area E faces the corners of the case of the apparatus without a gap.

In the foregoing embodiments, the relative ratio of the capacitances $Cm_0$ and $Cm_1$ between the finger 30 and respective detection electrodes $11_0$ and $11_1$ opposed to the finger 30 in either of the X and Y direction is approximately equal to the reciprocal ratio of the distances in the opposed direction from the input operation position (x,y) on the XY plane, where the finger 30 is projected on the glass substrate 31, to the opposed detection electrodes $11_0$ and $11_1$. The input operation position (x,y) on the input operation area E can thus be detected regardless of whether the finger 30 is in contact with the glass substrate 31. When an input operation is made without the finger 30 in contact with the glass substrate 31, the interposition of the capacitances Cmb using air having a low specific permittivity of approximately 1 as the dielectric significantly reduces the reception levels Vi appearing on the detection electrodes 11 even for the same input operation position. Then, the MPU 10 may compare the input reception level Vi appearing on a specific detection electrode 11 at each scan period. If the input reception level Vi increases at a rate beyond a predetermined threshold, the MPU 10 can determine that a touch input of bringing the finger 30 into contact with the glass substrate 31 is made. If the reception level Vi decreases at a rate beyond a predetermined threshold, the MPU 10 can determine that an operation of releasing the finger 30 from the glass substrate 31 is made. In such a manner, the input operation positions of two types of input operations can be output.

The MPU 10 can determine a touch operation by simply monitoring the reception level Vi appearing on a specific detection electrode 11. During waiting time for waiting an input operation, an intermittent detection mode may thus be implemented in which only the reception level Vi appearing on a specific detection electrode 11 is detected. If a touch input is detected, all the circuits are activated to enter a detection mode for detecting the input operation position. This can reduce the power consumption during the waiting time.

Figure 13:
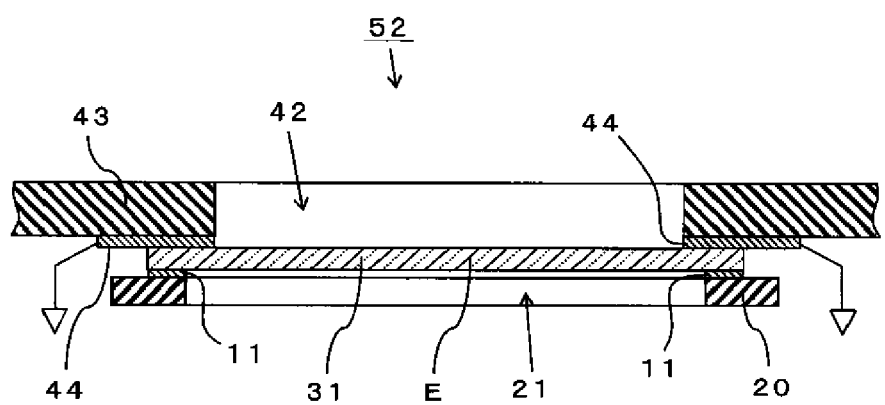
FIG. 13 is a longitudinal sectional view of a capacitive touch panel 52 according to another embodiment of the present invention.

In the foregoing embodiments, the shield plate 32 covering the detection electrodes 11 from above is erected and supported on the insulating substrate 20. As shown in FIG. 13, a touch panel 52 may include an apparatus case 43 that makes the input operation area E face outside through a window hole 42. A grounded shield layer 44 may be formed on an inner bottom surface of the case 43 so that the shield layer 44 covers the detection electrodes 11 from above. The shield layer 44 may be formed on the surface side of the case 43 for the same purpose.

In the foregoing embodiments, the detection electrodes 11 are made of a conductive pattern formed on the insulating substrate 20 and metal plates erected and supported by the through holes 34 of the insulating substrate 20. However, the detection electrodes 11 may be made of a conductive layer deposited on the bottom and/or side surfaces of the transparent input operation plate 31 such as a glass substrate.

In the foregoing embodiments, the detection electrodes 11 are oscillated at the output level Vs of the alternating-current detection signal SG with respect to the input operation member 30 so that a relative potential of the output level Vs occurs therebetween. However, the detection electrodes 11 may be fixed in potential, and the potential of the input operation member 30 may be oscillated at the output level Vs of the alternating-current detection signal SG.

While the input operation member 30 has been described to be a finger 30 with which the operator makes an input operation, the input operation member 30 may be an operation member separate from the operator. Examples thereof include a dedicated input pen held by the operator.

The opening 21 formed in a rectangular outline is not limited to the oblong rectangular outline. The opening 21 may be formed in an arbitrary shape.

The two separate types of substrates, namely, the non-oscillation side circuit substrate 2 and the oscillation side circuit 3 may be configured as a single circuit substrate as long as the reference power supply circuit 4 and the oscillation power supply circuit 7 are separately wired.

The present invention is suitable for a capacitive touch panel on the rear side of which a display device is arranged via an input operation area, and which detects an input operation position of an input operation member on the input operation area.

REFERENCE SIGNS LIST 1 capacitive touch panel (first embodiment)
10 MPU (input position detecting means, touch input detecting means)
11 detection electrode
14 integral processing circuit (signal detecting means)
15 oscillation circuit (transmitting means)
20 insulating substrate (insulating support member)
21 opening
30 finger (input operation member)
31 glass substrate (transparent input operation plate)
32 shield plate
41 arrangement direction detection electrode
42 window hole
43 case
44 shield layer
E input operation area
SG alternating-current detection signal
Vi reception level of alternating-current detection signal

The invention claimed is:

1. A capacitive touch panel that includes a plurality of detection electrodes insulated from each other and detects an input operation position of an input operation member on the basis of arrangement positions of the respective detection electrodes and capacitances between the respective detection electrodes and the input operation member, the capacitive touch panel comprising: an insulating support member that has an opening; a transparent input operation plate that is supported by the insulating support member to cover an aperture of the opening, and at least an input operation area of which above the opening is made of a see-through transparent member; the plurality of detection electrodes that are in contact with the transparent input operation plate and are arranged on the transparent input operation plate or the insulating support member around the opening so as to be insulated from each other; transmitting means for transmitting an alternating-current detection signal that changes relative potentials between the input operation member and the respective detection electrodes; a reference power supply circuit that includes a low-voltage reference power supply line and a high-voltage reference power supply line; an oscillation power supply circuit that includes a low-voltage oscillation power supply line connected to the low-voltage reference power supply line via a first coil and a high-voltage oscillation power supply line connected to the high-voltage reference power supply line via a second coil; signal detecting means for detecting a reception level of the alternating-current detection signal appearing on each of the detection electrodes via a capacitance between each of the detection electrodes and the input operation member; and input position detecting means for comparing relative distances between the input operation member and the arrangement positions of the respective detection electrodes on the basis of the reception levels of the alternating-current detection signal detected by the signal detecting means at the respective detection electrodes, and detecting the input operation position of the input operation member on the input operation area, wherein the respective detection electrodes are connected to one of the low-voltage oscillation power supply line and the high-voltage oscillation power supply line, and the transmitting means is connected to the low-voltage reference power supply line via a first capacitor and connected to the high-voltage reference power supply line via a second capacitor.

2. The capacitive touch panel according to claim 1, comprising touch input detecting means for, if the reception level of the alternating-current detection signal appearing on any one of the detection electrodes increases at a rate higher than or equal to a predetermined threshold as compared to the reception level immediately before, determining that a touch input of touching the transparent input operation plate with the input operation member is made.

3. The capacitive touch panel according to claim 2, wherein
the signal detecting means detects only the reception level of the alternating-current detection signal appearing on one or a plurality of specific detection electrodes until the touch input detecting means determines that a touch input is made,
after the touch input detecting means determines that a touch input is made, the signal detecting means detects the reception levels of the alternating-current detection signal appearing on all the detection electrodes, and
the input position detecting means detects an input operation position of an input operation of touching the transparent input operation plate with the input operation member on the basis of the reception levels of the alternating-current detection signal detected at the respective detection electrodes.

4. The capacitive touch panel according to claim 1, comprising one or a plurality of the detection electrodes arranged on each of two sides of the opening opposed in either one of orthogonal X and Y directions, the one or plurality of detection electrodes being arranged along a direction orthogonal to the opposed direction, and wherein
the input position detecting means compares relative distances between the input operation member and the two respective sides of the opening on the basis of the reception levels of the alternating-current detection signal appearing on the detection electrodes arranged on the two sides, and detects the input operation position in the opposed direction on the input operation area along an XY plane.

5. The capacitive touch panel according to claim 4, wherein the detection electrodes have an erected surface that is erected in a Z direction and faces in the opposed direction.

6. The capacitive touch panel according to claim 5, wherein the detection electrodes are formed by vapor deposition on end surfaces of the transparent input operation plate.

7. The capacitive touch panel according to claim 4, wherein with a plurality of the detection electrodes arranged along either one of the X and Y directions around the opening as arrangement direction detection electrodes,
the input position detecting means compares the reception levels of the respective arrangement direction detection electrodes and detects the input operation position in an arranged direction on the input operation area along the XY plane.

8. The capacitive touch panel according to claim 7, wherein the input position detecting means compares the reception levels of the respective arrangement direction detection electrodes and detects the input operation position in the arranged direction on the basis of an arrangement position of the arrangement direction detection electrode at which the maximum reception level is detected.

9. The capacitive touch panel according to claim 7, wherein
the opening has a rectangular outline along the X and Y directions;
the plurality of detection electrodes are arranged only on both sides of the opening opposed in either one of the X and Y directions, the detection electrodes being arranged along a direction orthogonal to the opposed direction; and
the plurality of detection electrodes arranged along the direction orthogonal to the opposed direction on at least one side of the opening are used as the arrangement direction detection electrodes.

10. The capacitive touch panel according to claim 1, further comprising a shield member that covers the detection electrodes from above in a direction orthogonal to the input operation area to avoid an effect by a capacitive coupling between an upper part of the input operation member and the detection electrodes.

11. The capacitive touch panel according to claim 10, wherein the shield member is a shield plate that is supported by the insulating support member.

12. The capacitive touch panel according to claim 10, wherein
the transparent input operation plate supported by the insulating support member is arranged in a case of an apparatus, the case making the input operation area face above through a window hole, and
the shield member is a shield layer that is formed on a surface or backside of the case around the window hole.

13. The capacitive touch panel according to claim 10, wherein the shield member entirely covers the detection electrodes in a direction orthogonal to the input operation area.

14. The capacitive touch panel according to claim 13, wherein the plurality of detection electrodes are arranged only on sides of the opening.

15. The capacitive touch panel according to claim 1, wherein the plurality of detection electrodes are arranged only on sides of the opening.

16. The capacitive touch panel according to claim 1, further comprising
a DC power supply that has a low-voltage terminal connected to the low-voltage reference power supply line and a high-voltage terminal connected to the high-voltage reference power supply line.

* * * * *